3,354,110
VINYL RESINS CONTAINING METAL SALTS OF BENZENE TRICARBOXYLIC ACIDS

James E. Horan, Chicago, Ill., and Richard E. Van Strien, Griffith, Ind., assignors to Standard Oil Company, Chicago, Ill., a corporation of Indiana
No Drawing. Original application Apr. 30, 1962, Ser. No. 191,283, now Patent No. 3,244,737, dated Apr. 6, 1966. Divided and this application Feb. 26, 1965, Ser. No. 444,485
4 Claims. (Cl. 260—31.8)

ABSTRACT OF THE DISCLOSURE

The properties of vinyl resin systems, comprising polymerized vinyl material containing 20% or more vinyl chloride units based on the vinyl units in the material, are improved by the addition of about 1–75 weight percent of the vinyl material of a metal salt having the formula:

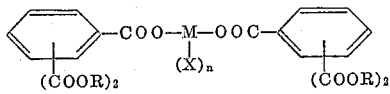

wherein R and X each contain up to 18 carbon atoms and are either alkyl, alkenyl, alkoxyalkyl or alkoxyalkenyl; M is either tin, germanium or lead; and $n$ is zero when M is divalent, and 2 when M is tetravalent.

---

This is a division of application S.N. 191,283, filed Apr. 30, 1962, now U.S. Patent 3,244,737.

This invention relates to metal salts of aromatic polycarboxylates and to their use as stabilizers and plasticizers in vinyl resins.

Vinyl resins have been known for some time and used in many important areas of industrial products such as protective coatings, floorings, paper treating materials, clothing, industrial tape, etc. In many of these and other important areas of use, the vinyl resins require incorporation of special additives known generally as stabilizers and plasticizers in order to improve the properties of the vinyl resins. Stabilizers are especially important in the vinyl resins containing vinyl chloride units. In most applications using vinyl chloride containing resins, it is essential that the vinyls be stabilized against thermal degradation of processing. Without the use of stabilizers the vinyls tend to dehydrochlorinate with rapid failure of mechanical properties after this degradation reaches the advanced stage. The addition of stabilizers to these vinyl resins is important in preventing this degradation of the vinyl resins.

An additional important purpose of the stabilizers is to prevent the change in color of the vinyl resins upon exposure to light. Without these light stabilizers the resins tend to change color when used in certain outdoor applications and it is therefore important that light stabilizers be incorporated into the vinyl resins.

It is important that the vinyl resins contain plasticizers to impart flexibility to the resins while enabling the resins to exhibit good tensile strength properties.

It has been discovered that the addition of a metal salt of aromatic diester to a vinyl resin imparts both stabilizer (heat and light) and plasticizer properties to the vinyl resin. The vinyl resin is a polymerized vinyl material containing some vinyl chloride units. The metal salt is derived from two molecules of a diester of a benzene tricarboxylic acid and may be illustrated by dibutyl tin di(diisooctyl trimellitate).

In conjunction with the preparation of the novel metal salts of this invention, it has been discovered that the diesters of benzene tricarboxylic acids can be prepared from the ester of the acid anhydride. Previously, preparation of these diesters had been attempted directly from the acid and generally only a conglomeration of esters had resulted including the monoesters, diesters, and triesters. In the novel preparation of the diesters described herein, it was found that the ester of the acid anhydride of the benzene tricarboxylic acid when reacted with a monohydric alcohol produced essentially only the diesters of the benzene tricarboxylic acid and that the yields of the diesters were extremely satisfactory.

The metal salt of this invention has the general formula:

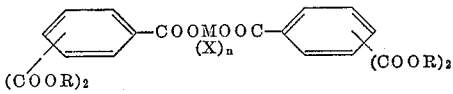

where R contains up to about 18 carbon atoms and is either an alkyl group (including cycloalkyl), alkenyl group (including cycloalkenyl), alkoxyalkyl group (including alkoxycycloalkyl), alkoxyalkenyl group (including alkoxycycloalkenyl) and/or substituted derivative, M is a metal and generally either tin, germanium or lead, X is selected from the same groups as R, and $n$ is equal to zero when M is divalent and equal to a number greater than zero when M has a valency greater than 2.

The R groups in general are those derived from monohydric alcohols and include the saturated and unsaturated groups derived from such compounds as methane, ethane, butane, hexane, octane, dodecane, tetradecane, hexadecane, octadecane, cyclopropane, cyclopentane, cyclohexane, bicyclohexane, bicyclodecane, tricyclotetradecane, etc.; and the alkoxy derivatives of these groups such as the alkoxyalkanes (including cycloalkanes), alkoxyalkenes (including cycloalkenes) and heterocyclic compounds containing ether groups in their cyclic structure such as tetrahydrofuran and the like.

The alkyl groups are preferred, especially the open-chain alkyl groups, and particularly the groups containing from about 4 to about 12 carbon atoms. These are readily available and impart very desirable properties to the resulting metal salts.

The R groups may be unsubstituted or substituted. However, the substituents should not include any groups such as hydroxy and amino groups which would react with any of the materials used to prepare the salt or the salt itself and which would reduce usefulness of the salt.

Substituents which may be incorporated into the R group include alkyl and alkenyl groups such as butyl, hexenyl, etc.; cyclohexyl, bicyclodecenyl, etc.; aryl groups such as phenyl, naphthyl, etc.; and halo groups such as chloro, fluoro, etc. and substituents which are made up of one or more of these groups such as a chlorinated butyl group.

It is to be understood that the esters in the metal salt may contain the same or different R groups and may, for example, contain all different R groups.

The COOR groups are attached to the phenyl groups of the metal salt. They may be attached to any of the available sites on the phenyl nucleus although it is preferred that one of the COOR groups be in an ortho position with respect to the carboxyl group attached to the metal M.

M represents a metal which reacts to form a metal salt of the diesters of the benzene tricarboxylic acids and which, as the metal salt, aids in improving the desired properties of the polymerized vinyl materials. Such metals include tin, germanium and lead with tin being preferred and especially tetravalent tin.

Examples of tin, germanium and lead salts are:

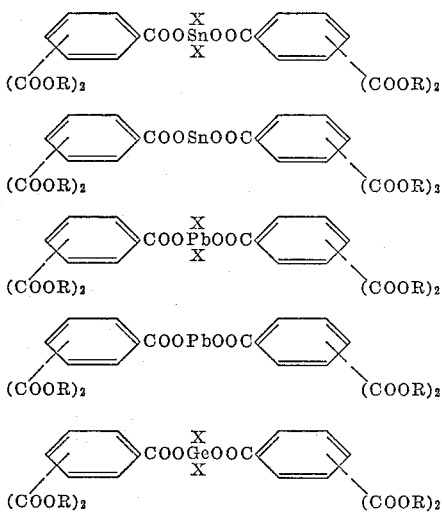

X represents an organic group attached to the metal M when the metal has a valency greater than 2. X may be represented by n which is equal to zero when M is a diva- that is the alkyl, alkenyl, alkoxyalkyl, alkoxyalkenyl groups, etc. It is preferred that X be an alkyl group, especially open-chain and particularly the group having from 1 to about 8 carbon atoms. These may be easily prepared and impart many desirable properties to the resulting metal salts.

The number of X groups attached to the metal M is represented by n which is equal to zero when M is a divalent metal and equal to a number greater than zero when M has a valency greater than 2. Generally, the metal M is either divalent or tetravalent and n is equal to zero when M is divalent and equal to 2 when M is tetravalent.

Especially useful metal salts of this invention are those compositions wherein R is an alkyl group (open-chain) having from about 4 to about 12 carbon atoms and preferably an isooctyl group, M is tetravalent tin, X is an alkyl group (open-chain) having from 1 to about 8 carbon atoms and preferably a butyl group, and n is equal to 2. It is also desirable that one of the COOR groups on each phenyl group is in an ortho position with respect to the carboxyl group attached to the tetravalent tin.

The metal salt or composition of this invention is generally prepared by first preparing the diester of the benzene tricarboxylic acid such as trimellitic acid, trimellitic anhydride, hemimellitic acid, hemimellitic anhydride, or trimesic acid and then reacting the diester or, if desired, a mixture of the diesters with a metal containing compound such as dibutyl tin diacetate to produce the metal salt of this invention. With dibutyl tin diacetate, a temperature in the order of about 140° F. and a vacuum in the order of about 15 mm. of Hg may be utilized with the removal of the acetic acid of reaction as a gas. Especially good results are achieved with dibutyl tin diacetate when the temperature is in the order of 125–140° F., the vacuum is about 10–15 mm. of Hg, and the time of reaction is about 46 hours with the acetic acid being recovered in a Dry Ice trap. Other metal containing compounds may be used in addition to the dibutyl tin diacetate, such as tin diacetate, dimethyl tin oxide, diethyl tin oxide, dipropyl tin oxide, ethyl propyl tin dichloride, dicyclo hexyl tin dichloride, dioctyl tin dichloride, didodecyl tin dichloride, lead diacetate, diethyl lead dichloride, dipropyl lead dichloride, dicyclohexyl lead dichloride, diethyl germanium dichloride and dipropyl germanium dichloride.

The diesters may be prepared by reacting a monohydric alcohol with the benzene tricarboxylic acid directly, or preferably first preparing a monoester first and then reacting the monoester with a monohydric alcohol to produce the diester. It is especially desirable that the monoester be derived from a benzene tricarboxylic acid capable of forming an anhydride group, with the monoester of the acid anhydride (such as trimellitic anhydride or hemimellitic anhydride) being preferred as a starting material for the preparation of the diesters.

The above described reaction gives especially good results when the monoester is the 4-ester of trimellitic anhydride. The resulting diesters are essentially the 1,4- and 2,4-diesters of trimellitic acid.

The monoester also serves as a very suitable starting material when a diester having different R groups is desired. In that event, the monohydric alcohol has an R group different from that in the monoester.

It is advantageous when reacting the monoester of the acid anhydride with the monohydric alcohol to keep the reaction temperature below about 150° C. and preferably between about 25–60° C. At or slightly below 180° C. a disproportionation of the diester occurs with the resulting products being only the monoesters of the acid anhydride and triesters. When the diesters are desired as the product, it is desirable to react the monoester of the acid anhydride with the monohydric alcohol at a temperature below that at which the disproportionation occurs. The term "below about 150° C." is considered to include those temperatures at which the reaction can be carried out to produce the desired diesters without a significant adverse effect of the aforedescribed disproportionation.

The ratio of alcohol to monoester is generally about 1 and preferably about 1–3.

The monohydric alcohol includes any of the alcohols which contain the defined R group, with the alkanols being preferred, especially those having up to about 18 carbon atoms.

The monoesters may be prepared by reacting the benzene tricarboxylic acid or its anhydride with a monohydric alcohol under the usual conditions of esterification and recovering the monoesters by distillation. Another general and preferred method is by first converting one of the carboxyl groups of the benzene tricarboxylic acid into an acid chloride group and then reacting the acid chloride with a monohydric alcohol under anhydrous conditions at a temperature in the order of about 70° C. with the removal of the hydrogen chloride produced by the reaction. When the 4-acid chloride of trimellitic anhydride is utilized, this second method produces a 4-ester of the trimellitic anhydride.

Generally, the diesters produced from the monoester of the acid anhydride and the monohydric alcohol contain very little if any monoester or triesters of the acid when the temperature conditions are kept within the desired limits. No additional steps for recovering the diesters are necessary when the monoesters or triesters are essentially absent. In the event that any of the products contain monoster and/or triesters in addition to the diesters, either because of the starting materials or reaction conditions, then it may be desirable to recover the diesters from the mixture. The recovery may be carried out by first converting any anhydride groups in the monoesters to carboxyl groups and then adding the mixture of esters to liquid hexane which will dissolve the diesters and triesters but not the monoesters of the acid. The diesters may then be separated from the triesters by such methods as converting the diesters to a metal salt and then utilizing the difference in solubility between the metal salt and the triesters in such solvents as water, the lower alcohols, etc. to separate the esters.

The metal salts of this invention are especially useful in imparting heat and light stability to polymerized vinyl materials which contain some vinyl chloride units, especially at least about 20% of vinyl chloride units and preferably at least about 70% of vinyl chloride units based on the vinyl units in the vinyl material. The vinyl materials may contain vinyl chloride units in excess of the percentages described and can include up to 100% vinyl chloride units.

The term "vinyl materials" refers to vinyl containing compounds which have a vinylidene group ($CH_2=CH<$) such as vinyl chloride, vinyl acetate, vinylidene chloride and other vinyl esters of monocarboxylic acids, esters of maleic and fumaric acid such as ether maleate and ether fumarate and the like. These and other monomers which contain a vinylidene group and are co-polymerizable with the vinyl chloride are suitable and may be in the vinyl materials. The vinyl materials may also contain varying amounts of other synthetic and natural materials or resins, for example, the cellulose derivatives such as cellulose nitrate, cellulose acetate, cellulose acetobutyrate, ethyl cellulose, benzyl cellulose and the like, together with plasticizers, stabilizers, fillers and pigments.

The vinyl resin compositions of this invention may be in the form of solid molding materials, paste, lacquers, solutions or dispersions. In the preparation of the compositions comprising the polymerized vinyl materials, the metal salt of this invention may be blended with the polymerized vinyl material in a conventional manner, for example, by mixing and heating on a roll mill, Banbury type mixers or other suitable mixing devices, at a temperature from about 125° C. to about 180° C. and preferably about 160° C.

The mixture of the polymerized vinyl materials and metal salt may be treated further to improve its properties by compressing the material in a preheated mold at a temperature in the order of about 175° C.

The relative amounts of the polymerized vinyl material and the metal salt may be varied over wide limits according to the particular properties required, with the metal salt being present in an amount sufficient to improve the stability of the polymerized vinyl material when exposed to heat and/or light. Amounts similar to those conventionally used with other stabilizers may be employed, with the proportion of the metal salt being at least about 1% by weight of the polymerized vinyl material and preferably in the order of 2–4% and above. When the metal salt of this invention is utilized both for its desirable stabilizer and plasticizer properties, then the amounts of the metal salt may be greater as from about 10–75%.

The metal salt of this invention may be employed as the sole stabilizer and plasticizer in the polymerized vinyl material or may be used in admixture with other known stabilizers such as dibutyl tin dilaurate, etc. and plasticizers such as dibutyl phthalate, di-2-ethylhexyl phthalate, diisooctyl phthalate, and the like; and similar esters of, for example, adipic acid, phosphoric acid, sebacic acid, etc. and may replace a portion of the metal salt, the total amount of stabilizers and/or plasticizers employed being within the ranges previously indicated. Secondly, plasticizers or extenders having lesser compatibility with polymerized vinyl materials, for example, butyl stearate, may be employed in admixture with the metal salt and vinyl material to obtain compositions having desirable physical properties. Lubricants such as stearic acid may also be utilized. Other useful additives may be present such as fillers, pigments, and the like which are conventionally employed in preparing the vinyl compositions or resins for particular application.

The composition comprising the polymerized vinyl materials and the metal salts are suitable for applications previously requiring vinyl compositions including, for example, molding, extrusion, coating applications, etc.

The following examples illustrate the preparation and utilization of some embodiments of this invention. It will be understood that these are for illustrative purposes only and do not purport to be wholly definitive with respect to conditions or scope.

Examples I–V pertain to the preparation of the diesters of trimellitic acid.

*Example I*

1,4 diisooctyl trimellitate and 2,4 diisooctyl trimellitate were prepared by mixing 91.2 grams of 4-isooctyl trimellitate anhydride (0.3 mole) and 39.0 grams of isooctyl alcohol (0.3 mole) in a 250 ml., one neck, round bottom flask fitted with a stirrer and thermometer. The contents of the flask were heated for about 48 hours at 40–50° C. At the end of this time the Acid Number of the liquid product was 131 (theory 129) and the infrared spectra indicated complete loss of the anhydride ring by the loss of absorbance at 5.35 and 5.6 microns.

A sample (approximately 10 ml.) was added to hexane (approximately 50 ml.) to determine the presence of any monoester of trimellitic acid in the product. It was known that the monoesters of the acid are insoluble in hexane while the diesters are soluble. The sample was completely soluble in the hexane.

These results demonstrate that the diesters had been prepared from the 4-ester and that the 4-ester had been completely converted to the diesters.

*Example II*

574 grams of 4-isooctyl trimellitate anhydride (1.88 moles) and 246 grams of isooctyl alcohol (1.88 moles) were mixed together in a one liter, 3 neck round bottom flask fitted with a stirrer and thermometer, for 18 hours at 90° C. At the end of this time the product had an Acid Number of 130 and the infrared spectra showed a complete loss of the anhydride ring. The product of 1,4 diisooctyl trimellitate and 2,4 diisooctyl trimellitate was a clear, near colorless liquid. These results demonstrate that a temperature of 90° C. is suitable for preparing the diesters.

*Example III*

140 grams of 4-isooctyl trimellitate anhydride (0.46 mole) and 34 grams of n-butanol (0.6 mole) were stirred together for 96 hours at 25° C. in a one liter, 3 neck round bottom flask fitted with a stirrer thermometer, well and stopper. At the end of this time the product had an Acid Number of 144 (theory 145) and the infrared spectra indicated complete loss of the anhydride ring. The product was 1-butyl-4-isooctyl trimellitate and 2-butyl-4-isooctyl trimellitate. It was a liquid having a clear, straw yellow color. These results demonstrate that butyl-isooctyl diesters can be prepared and that a temperature of 25° C. was suitable.

*Example IV*

46.5 grams of 4-methyl trimellitate anhydride (0.226 mole) in 29.4 grams of isooctyl alcohol (0.226 mole) were stirred together at 25° C. in a 200 ml., 3 neck round bottom flask fitted with a stirrer, stopper and thermometer. After 8 days all of the 4-methyl ester had gone into solution. The product had an Acid Number of 182 (theory 183) and the infrared spectra indicated no anhydride ring present. The product was 1-isooctyl-4-methyl trimellitate and 2-isooctyl-4-methyl trimellitate. It was a liquid having a clear, water white color. These results demonstrate that the 4-methyl ester can be used as a starting material and that the isooctyl-methyl diesters can be prepared from it.

*Example V*

To indicate that problems are encountered about 180° C., a run was made with 101 grams of 1 (2), 4-diisooctyl trimellitate (0.23 mole). The diester was heated in a 200 ml., 3 neck round bottom flask fitted with a nitrogen sparge thermometer and Barrett Trap attached to a condenser. The temperature was slowly raised and the following was observed.

| Time | Temperature, °C. | Remarks |
|---|---|---|
| 0 hrs | 30 | Heating started. |
| ½ hr | 180 | H₂O evolution incipient. |
| 1 hr | 230 | 1.9 cc. H₂O collected. |
| 2 hrs | 230 | |
| 6 hrs | 230 | Heat off. |

Theoretical $H_2O$ revolution was calculated to be 1.96 cc. The product was straw yellow in color. The infrared spectra showed no carboxyl groups, positive anhydride groups and no alcohol or water. The mass spectra showed only 4-isooctyl trimellitate anhydride and triisooctyl trimellitate present. This indicates that there was a disproportionation of the diester into the monoester and triester when the temperature was raised between 180–230° C.

*Example VI*

175 grams of a mixture of 1,4-diisooctyl trimellitate and 2,4-diisooctyl trimellitate (0.4 mole) were mixed with 71 grams of dibutyl tin diacetate (0.20 mole) at 125–140° F. in a 500 ml., 3 neck, round bottom flask fitted with a stirrer, thermometer and vacuum side arm. The vacuum side arm was attached to a Dry Ice trap which in turn was attached to a vacuum pump. Heating and stirring of the contents of the flask were continued for 46 hours at 10–15 mm. of Hg. At the end of this time 23.7 grams of acetic acid (0.392 mole) had been collected in the Dry Ice trap (theory 0.40 mole). The product in the flask was a liquid and was analyzed to give the following results compared to the calculated results.

TABLE I

| | Calculated | Observed |
|---|---|---|
| Hydrolysis No | 103 | 102. |
| IR Spectra: | | |
| Carboxyl | None | None. |
| Anhydride | do | Do. |
| Ester | Positive | Positive. |

These results demonstrate that dibutyl tin di(diisooctyl trimellitate) was prepared.

*Example VII*

The dibutyl tin di(diisooctyl trimellitate) prepared in Example VI was evaluated as a stabilizer against dibutyl tin dilaurate, a commercial stabilizer, in a vinyl plastic. The vinyl plastic was prepared from 100 parts by weight of a polyvinyl chloride resin, 50 parts by weight of diisooctyl phthalate, 3 parts by weight of the tin salt and 0.5 part by weight of stearic acid. The polyvinyl chloride resin had the following general properties: specific gravity, 1.40, and specific viscosity, 0.52–0.58; and was obtained from the B. F. Goodrich Chemical Company under the name Geon 101. The compounds were milled for about 10 minutes at 310° F. and the resulting material had a thickness of about 85 mils. The 85 mil material was then molded at 345° F. for about 5 minutes at 1000 p.s.i. in pre-heated molds and the resulting material had a thickness of about 75 mils.

Tests were then run on samples of the 75 mil materials containing the tin salts. Heat stability was determined by placing 1 x 1 inch samples of the 75 mil materials in a forced draft oven at 160° C. One sample of each compound was removed every half hour up to 5 hours. Samples were then removed and assigned a qualitative rating.

Light stability was determined by placing 2 x 4 samples of the vinyl compounds a distance of one foot beneath a GE sun lamp on a rotating turntable. After 100 hours exposure the samples were removed and the exposed color was compared to the initial color.

In the heat stability tests, the vinyl plastic containing the trimellitate salt did not darken as rapidly as the vinyl plastic containing the dilaurate salt. The change in darkness indicated the degree of instability of vinyl plastic. These results demonstrate that superior heat stability properties were imparted to the vinyl plastic by the trimellitate unit.

In the light stability tests, the vinyl plastic containing dibutyl tin di (diisooctyl trimellitate) remained stable in color (did not bleach nor darken in color) while the vinyl plastic containing dibutyl tin dilaurate bleached from a yellow tint to colorless. These results demonstrate that superior light stability properties were imparted to the vinyl plastic by the trimellitate salt.

*Example VIII*

The plasticizer properties of the dibutyl tin di(diisooctyl trimellitate) were examined by preparing a vinyl plastic from the following materials: 100 parts by weight of the vinyl chloride resin described in Example VII, 10 parts by weight of the tin salt, 40 parts by weight of diisooctyl phthalate, and 0.5 part by weight of stearic acid. The vinyl plastic was tested for common plasticizer properties: volatility loss at 100° C. after 100 hours, strength, elongation and brittleness temperature.

The volatility (carbon volatility) was determined after a 24 hour run at 100° C. with the percent weight loss of the sample recorded. Tensile testing was run on 75 mil samples using a crosshead speed of 20 inches per minute and 1 inch gauge, "C die" dumbbells. Brittleness temperature was determined according to ASTM procedure D-746. The temperature in degrees centigrade where 50% failure occurs was reported.

The test results are listed in Table II below along with values for a polyvinyl chloride plastic or resin containing 35% by weight of dioctyl phthalate, a commercial plasticizer (page 396 of Organic Coating Technology, volume 1, by Henry Fleming Payne) to indicate the desirable properties in a plasticized vinyl chloride resin.

TABLE II

| | Tin Salt With PVC | DOP With PVC |
|---|---|---|
| Volatility Loss, percent | 5.2 | (¹) |
| 100% Modulus, p.s.i | 1,880 | 1,040 |
| Tensile Strength, p.s.i | 2,700 | 2,580 |
| Elongation, percent | 300 | 300 |
| Brittleness Temp., ° C | −30 | −32 |

¹ Not reported.

These results demonstrate that the vinyl plastic containing the tin salt exhibited properties considered to be very suitable for a plasticized vinyl material.

Thus having described the invention, what is claimed is:

1. A composition comprising (A) a polymerized vinyl material containing at least about 20% of vinyl chloride units based on the vinyl units in said material, and (B) about 1–75 weight percent of said vinyl material of a compound having the formula:

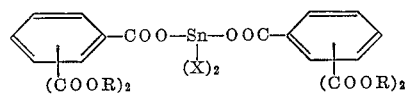

wherein R and X are each $C_{1-18}$ alkyl.

2. The composition of claim 1 wherein one of said COOR groups on each phenyl is ortho to the carboxyl group attached to tin in compound (B).

3. The composition of claim 1 wherein R is $C_{4-12}$ alkyl, and X is $C_{1-8}$ alkyl in compound (B).

4. The composition of claim 1 wherein R is isooctyl, X is butyl, and one of said COOR groups on each phenyl is ortho to the carboxyl attached to tin in compound (B).

References Cited

UNITED STATES PATENTS 3,245,948  4/1966  Hendricks et al. ____ 260—45.75

MORRIS LIEBMAN, *Primary Examiner.*

ALLAN LIEBERMAN, *Examiner.*